(12) United States Patent
Yamazaki

(10) Patent No.: US 6,877,067 B2
(45) Date of Patent: Apr. 5, 2005

(54) SHARED CACHE MEMORY REPLACEMENT CONTROL METHOD AND APPARATUS

(75) Inventor: Shinya Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 136 days.

(21) Appl. No.: 10/166,625

(22) Filed: Jun. 12, 2002

(65) Prior Publication Data
US 2002/0194433 A1 Dec. 19, 2002

(30) Foreign Application Priority Data

Jun. 14, 2001 (JP) ........................................ 2001-179637

(51) Int. Cl.[7] .............................................. G06F 12/00
(52) U.S. Cl. ........................ 711/128; 711/120; 711/124; 711/128; 711/133; 711/134; 711/141; 711/144; 710/1; 710/36; 710/39; 710/52; 710/100; 710/107; 710/200
(58) Field of Search ................. 711/118–124, 128–137, 711/141, 144, 148, 159, 168, 147; 710/1, 36, 39, 52, 100, 107, 200

(56) References Cited

U.S. PATENT DOCUMENTS

| | | | | |
|---|---|---|---|---|
| 4,736,293 A | * | 4/1988 | Patrick ....................... 711/128 |
| 5,553,262 A | * | 9/1996 | Ishida et al. ................. 711/123 |
| 6,038,647 A | * | 3/2000 | Shimizu ...................... 711/168 |
| 6,205,519 B1 | * | 3/2001 | Aglietti et al. .............. 711/133 |
| 6,434,669 B1 | * | 8/2002 | Arimilli et al. ............. 711/128 |
| 6,560,676 B1 | * | 5/2003 | Nishimoto et al. ......... 711/128 |
| 6,598,123 B1 | * | 7/2003 | Anderson et al. ........... 711/133 |

FOREIGN PATENT DOCUMENTS

JP   S63-254543 A   10/1988

OTHER PUBLICATIONS

Albonesi, Nov. 16–18, 1999, IEEE, pp. 248–259.*

* cited by examiner

Primary Examiner—Donald Sparks
Assistant Examiner—Hahem Farrokh
(74) Attorney, Agent, or Firm—Sughrue Mion, PLLC

(57) ABSTRACT

In a multiprocessor system in which a plurality of processors share an n-way set-associative cache memory, a plurality of ways of the cache memory are divided into groups, one group for each processor. When a miss-hit occurs in the cache memory, one way is selected for replacement from the ways belonging to the group corresponding to the processor that made a memory access but caused the miss-hit. When there is an off-line processor, the ways belonging to that processor are re-distributed to the group corresponding to an on-line processor to allow the on-line processor to use those ways.

9 Claims, 7 Drawing Sheets

```
if (both processors 111 and 112 are on-line){ if (processor 111 causes a cache miss){
        reference comparison bits of way 0 and those of way 1 and
        generate reference way signal
    } else if (processor 112 causes a cache miss){
        reference comparison bits of way 2 and those of way 3 and
        generate reference way signal
    } else if (one of processors 111 and 112 is off-line){
    select replacement object based on LRU bits of way 0 - way 3 and
    generate reference way signal
}
```

FIG.5

P1 OUTPUTS AN ADDRESS IN E (MISS-HIT, REPLACEMENT OCCURS)

P0 OUTPUTS AN ADDRESS IN A (MISS-HIT, REPLACEMENT OCCURS)

P0 OUTPUTS AN ADDRESS IN B (MISS-HIT, REPLACEMENT OCCURS)

SHARED CACHE MEMORY REPLACEMENT CONTROL METHOD AND APPARATUS

BACKGROUND OF THE INVENTION

The present invention relates to a multiprocessor system in which a plurality of processors share cache memory in the n-way set associative method (where, n is 2 or larger), and more particularly to a replacement control technology that is applicable when a miss-hit occurs.

Conventionally, a multiprocessor system composed of a plurality of processors has been used to increase the processing performance of an information processing system. The advanced technology also makes it possible to provide an on-chip multiprocessor system where a multiprocessor system is built on one chip. In the field of a multiprocessor system or an on-chip multiprocessor system, considerable study has been made on the cache configuration and many inventions have been made for it to increase the hit ratio of the cache memory and to reduce the number of cycles required for data transfer from the cache memory to a register.

There are two cache configuration methods: one is a private cache method in which each of a plurality of processors has its own cache memory and the other is a shared cache method in which a plurality of processors shares a cache memory. Compared with the private cache method, the shared cache method requires fewer memory devices. Therefore, the shared cache method is advantageous to an on-chip multiprocessor system with a limited chip dimension or to a case in which compactness and low-cost are important.

With reference to the drawings, the operation of a conventional standard multiprocessor system using a shared cache method will be described.

Referring to FIG. 7, a multiprocessor system with the shared cache includes processors P0 and P1, a cache controller CC, a cache memory BS, and a main memory MS. The cache memory BS is the 4-way set-associative. When a miss-hit occurs, the LRU method is used to replace a block with another.

For example, assume that the processor P0 sequentially outputs addresses in blocks A and B and, then, the processor P1 sequentially outputs addresses in blocks C, D and E. After that, assume that the processor P0 sequentially outputs addresses in blocks A and B again. Note that blocks A–E are all in the same set i and that the cache memory BS is in the initial state.

When the processor P0 outputs addresses in blocks A and B and the processor P1 outputs addresses in blocks C and D, the copies of blocks A, B, C and D are stored in ways 0, 1, 2, and 3 of set i of the cache memory BS, respectively (FIG. 8a).

After that, when the processor P1 outputs an address in block E, a miss-hit occurs and the copy of block A stored in the least-recently referenced way 0 is replaced by the copy of block E (FIG. 8b). In addition, when the processor P0 outputs an address in block A, a miss-hit occurs and the copy of block B stored in the least-recently referenced way 1 is replaced by the copy of block A (FIG. 8c). Finally, when the processor P0 outputs an address in block B, a miss-hit occurs and the copy of block C stored in the least-recently referenced way 2 is replaced by the copy of block B (FIG. 8d).

In the prior art described above, when a plurality of processors P0 and P1 access many blocks (more blocks than the number of ways) in the same set i, the copy of a block accessed by one processor is sometimes replaced by the copy of another block accessed by the other processor with the result that a mist-hit (conflict-miss between processors) occurs. In the example shown in FIG. 8, the miss-hits shown in FIGS. 8c and 8d are those miss-hits that are caused by the replacement of the copy of block A, stored in way 0 in FIG. 8b. The problem is that a conflict-miss between processors, if generated, replaces data and slows the processing speed of the multiprocessor system.

SUMMARY OF THE INVENTION

In view of the foregoing, it is an object of the present invention to prevent a conflict-miss that occurs between processors.

To achieve the above object, in a multiprocessor system where a plurality of processors share an n-way set-associative cache memory, a plurality of ways of the cache memory are divided into groups, one for each of the processors. When a miss-hit occurs in the cache memory, one way to be replaced is selected from the ways belonging to the group corresponding to a processor that caused the miss-hit.

When a processor accesses a memory but causes a miss-hit, this constitution limits a way to be replaced to the ways belonging to the group that is corresponding to the processor caused miss-hit. This constitution prevents a cache-miss from being generated by a cache-memory write conflict between processors.

In addition, for use when there is an off-line processor, off-line distribution information, indicating how the ways belonging to the group of an off-line processor should be distributed to a group of an on-line processor, is prepared. If a miss-hit occurs when there is an off-line processor, one way to be replaced is selected from the ways belonging to the group of the processor that caused the miss-hit and the ways indicated by the off-line distribution information to be newly distributed to the processor that caused the miss-hit.

When a plurality of ways of the cache memory are simply divided into groups, one for each processor included in a multiprocessor system, and a processor enters the off-line state, the ways allocated to the off-line processor are not available for use and therefore the utilization efficiency of the cache memory is decreased. By contrast, when there is an off-line processor in the constitution described above, the ways belonging to the off-line processor are distributed to an on-line processor. As a result, even when there is an off-line processor, the constitution described above makes all the ways of the cache memory available for use, preventing the utilization of the cache memory from being decreased.

BRIEF DESCRIPTION OF THE DRAWINGS

These and other objects, features and advantages of the invention will become more fully apparent from the following detailed description taken in conjunction with accompanying drawings.

FIG. 5 is a diagram showing an algorithm of the operation of a replacement controller;

DETAILED DESCRIPTION OF THE PREFERRED EMBODIMENTS

Figure 1:
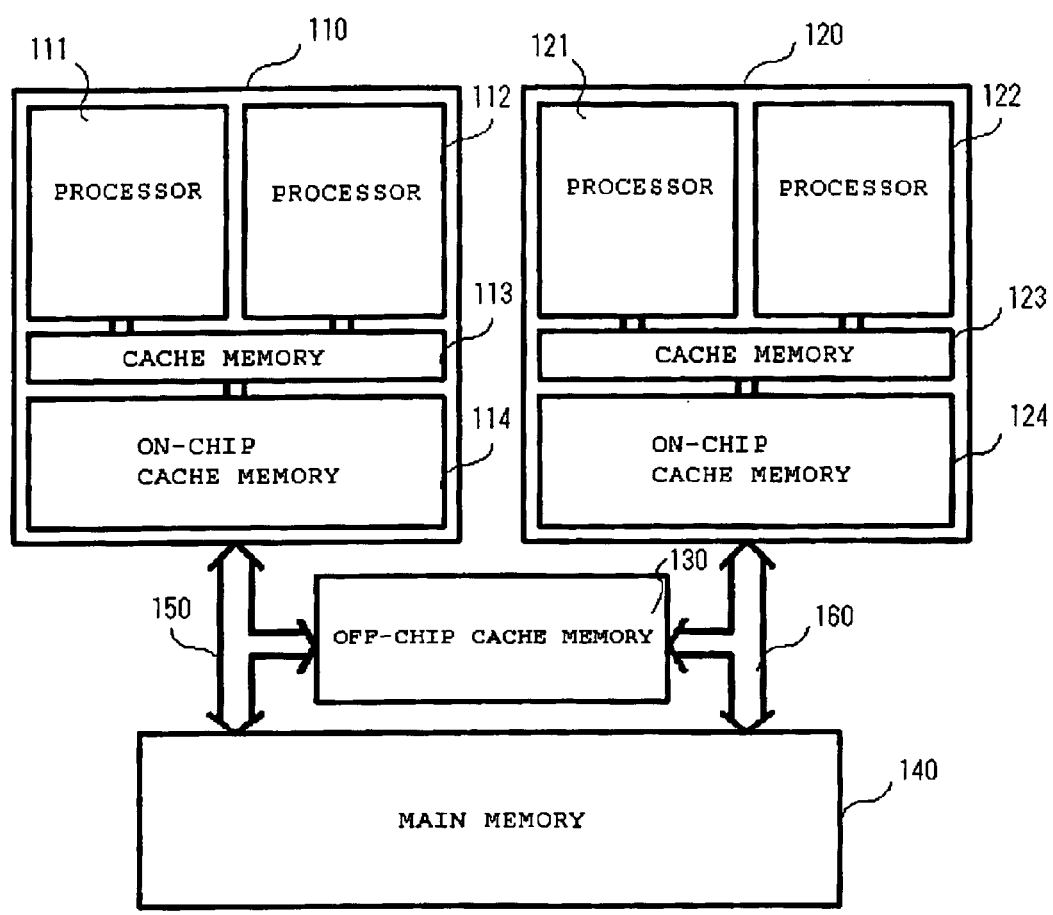
FIG. 1 is a block diagram showing a constitution of a first embodiment of the present invention.

Referring to FIG. 1, a system according to the present invention includes on-chip multiprocessor systems 110 and 120, an off-chip cache memory 130, a main memory 140, and memory buses 150 and 160.

The on-chip multiprocessor system 110 includes processors 111 and 112, a cache controller 113, and an on-chip cache memory 114. The on-chip multiprocessor system 120 includes processors 121 and 122, a cache controller 123, and an on-chip cache memory 124. The on-chip cache memories 114 and 124 are each a cache memory using the 4-way set-associative method.

Figure 2:
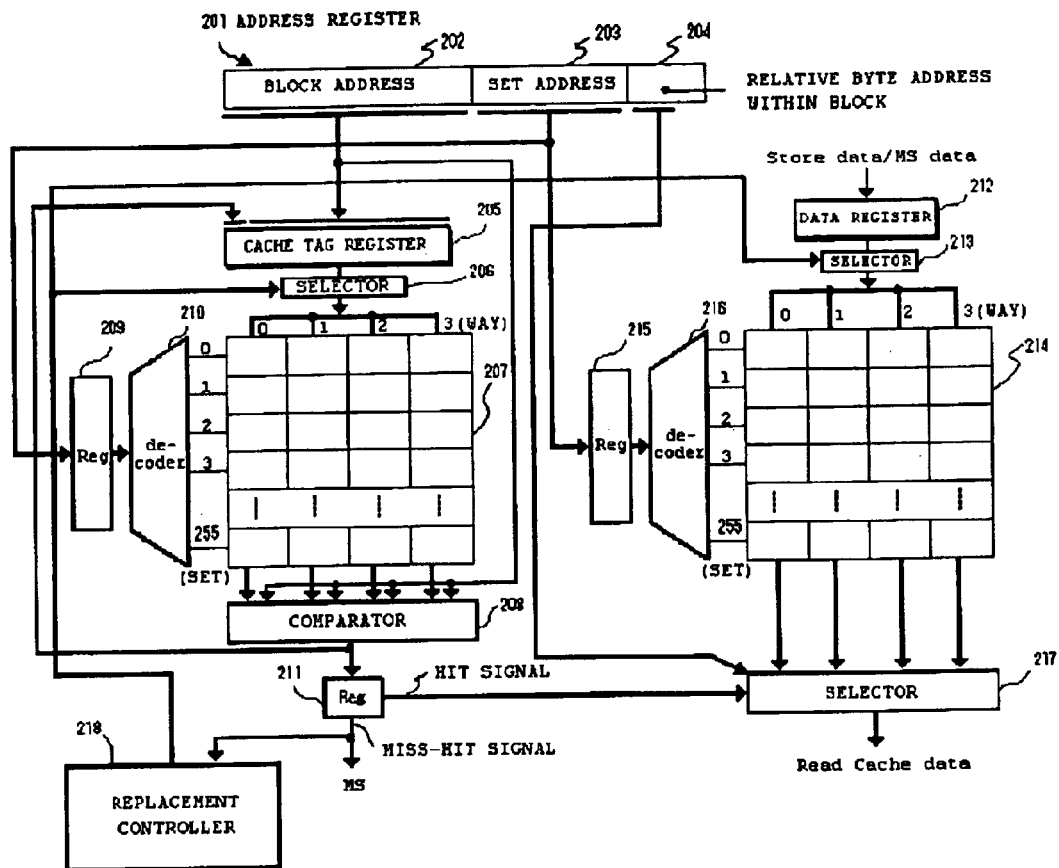
FIG. 2 is a block diagram showing a constitution of a cache controller and an on-chip cache memory.

FIG. 2 is a block diagram showing an example of a constitution of the cache controller 113 and the on-chip cache memory 114 shown in FIG. 1. The cache controller 123 and the on-chip cache memory 124 also have the similar constitution.

An address register 201 is a register in which a physical address (32 bits), which is used by the processors 111 and 112 to access the main memory 140, is stored. This physical address includes a block address 202 (18 bits), a set address 203 (8 bits), and a relative byte address within the block 204 (6 bits). Therefore, the number of sets of a directory 207 and that of a data array 214 is $2^8=256$ each.

Figure 3:
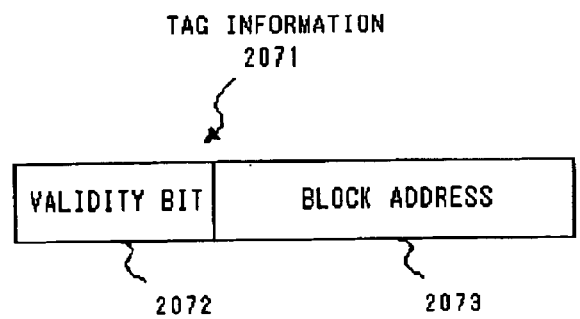
FIG. 3 is a diagram showing a constitution of tag information.

Each area of the data array 214 (4 ways×256 sets) contains a copy of a block of the main memory 140. As shown in FIG. 3, each area of the directory 207 (4 ways×256 sets) corresponding to each area of the data array 214 contains a tag information 2071 which is composed of a block address 2071 and a validity bit 2072. The block address 2073 is an address of the block of the main memory 140, which the corresponding area of the data array 214 has the copy. The validity bit 2072 indicates whether or not the copy is valid.

A register 209 is a register in which the set address 203 is held. A decoder 210 decodes the set address 203 held in the register 209 and outputs a selection signal selecting one of sets 0–255 of the directory 207.

A register 215 is a register in which the set address 203 is held. A decoder 216 decodes the set address 203 held in the register 215 and outputs a selection signal selecting one of sets 0–255 of the data array 214.

A comparator 208 receives following two: one is contents (tag information 2071) of ways 0–3 of a set that is one of 256 sets of the directory 207 and that is selected by the decoder 210, and the other is the block address 202 held in the address register 201. The comparator 208 compares the block address 2073, which is included in the tag information 2071 whose the validity bit 2072 indicates that the copy is valid, with the block address 202. If no match is found, the comparator 208 outputs a miss-hit signal; if a match is found, the comparator 208 outputs a hit signal. The hit signal includes select information indicating in which way the matching block address is stored.

A register 211 is a register that holds the hit signal or the miss-hit signal output from the comparator 208.

A selector 217 receives data that is stored in ways 0–3 of the set, selected by the selection signal from the decoder 216, of the data array 214. Upon receiving the hit signal from the comparator 208, the selector 217 selects the data of the way, which is identified by the select information included in the hit signal, from ways 0–3 entered from the data array 214 and outputs the selected data.

A cache tag register 205 holds tag information 2071 that is to be written in the directory 207 when a miss-hit occurs. On the other hand, a data register 212 holds a copy of a block that is to be written into the data array 214 when a miss-hit occurs.

When the miss-hit signal is output from the comparator 208, a replacement controller 218 outputs the replacement way signal indicating the way to be replaced. Constitution and operation of the replacement controller 218 will be described later in detail.

A selector 206 outputs the tag information 2071 held in the cache tag register 205 to the way that is one of 0–3 ways of the directory 207 and that is indicated by the replacement way signal outputted from the replacement controller 218. The directory 207 writes the tag information 2071 into the way that is specified by the selector 206 and that is belongs to a set, in which the miss-hit occurs, selected by the decoder 210.

On the other hand, a selector 213 outputs the copy of a block, which is held in the data register 212, to the way that is one of 0–3 ways of the data array 214 and that is indicated by the replacement way signal from the replacement controller 218. The data array 214 writes the copy of the block outputted from the selector 213 into the area identified by the output destination way and by the set selected by the decoder 216 (set in which the miss-hit occurred).

Figure 4:
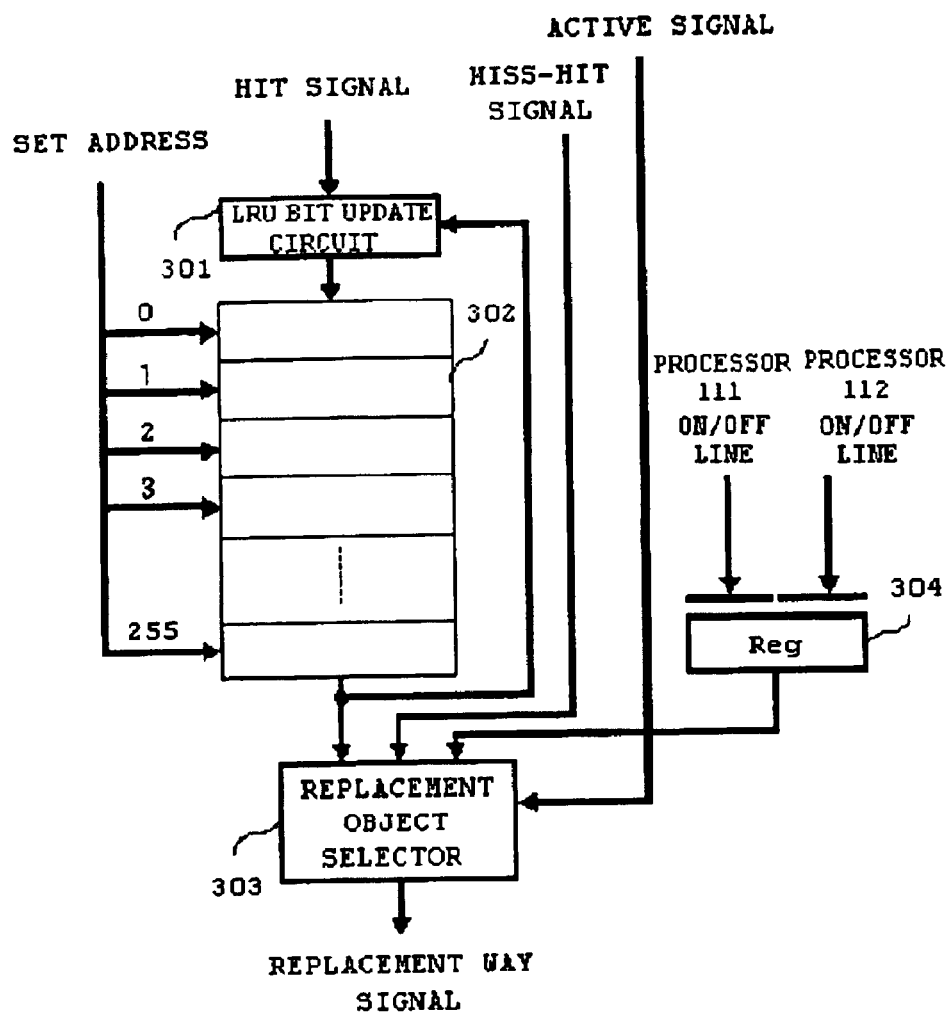
FIG. 4 is a block diagram showing a constitution of a replacement controller.

FIG. 4 is a block diagram showing an example of the constitution of the replacement controller 218 shown in FIG. 2. The replacement controller 218 includes an LRU bit update circuit 301, an LRU bit hold register 302, a replacement object selector 303, and a register 304.

The LRU bit hold register 302 is composed of 256 sets, set 0 to set 255. Each set contains the LRU bits indicating the order in which the four ways of the set were referenced. The eight LRU bits are used in this embodiment with first two bits assigned to way 0, the second two bits to way 1, the third two bits to way 2, and the fourth two bits to way 3. The bits corresponding to each way are set to "00", "01", "10", and "11" in order of reference.

When the hit signal is outputted from the comparator 208, the LRU bit update circuit 301 updates the LRU bit of the set, held in the LRU bit hold register 302, that is identified by the set address 203.

The register 304 contains on/off status information indicating whether the processors 111 and 112 are on-line or off-line (The failing processor is treated as off-line).

The replacement object selector 303 receives the miss-hit signal from the comparator 208, the output from the LRU bit hold register 302 (contents of the set selected by the set address), the on/off status information from the register 304, and the active signal from the processor 111 or the processor 112. The active signal, which is issued from the processor 111 or 112 when the processor 111 or 112 accesses the memory, includes information on the processor itself (for example, processor number).

Upon receiving the miss-hit signal from the comparator 208, the replacement object selector 303 executes the operation according to the algorithm shown in FIG. 5. With reference to FIG. 5, the operation of the replacement object selector 303 will be described.

The replacement object selector 303 manages the four ways in the directory 207 and the four ways in the data array 214 by dividing them into a group for the processor 111 (ways 0 and 1) and a group for processor 112 (ways 2 and 3). In addition, the replacement object selector 303 includes off-line distribution information. The off-line distribution information indicates that, when the processor 111 is off-line, ways 0–1 originally allocated to the group for the processor 111 are distributed to the processor 112 that is on-line and that, when the processor 112 is off-line, ways 2–3 originally allocated to the group for the processor 112 are distributed to the processor 111 that is on-line.

When the miss-hit signal is outputted from the comparator 208, the replacement object selector 303 executes one of the following, (A)–(D), based on the contents of the register 304 and on the processor (processor that made a memory access but caused a miss-hit) indicated by the active signal.

(A) When the on/off status information held in the register 304 indicates that both processors 111 and 112 are on-line and when the active signal indicates the processor 111:

The replacement object selector 303 compares the bits corresponding to ways 0 with the bits corresponding to way 1 (compares bits 0–1 with bits 2–3 in this embodiment). Those bits are included in the eight LRU bits outputted from the LRU bit hold register 302 and are allocated to the group for the processor 111. The replacement object selector 303 checks which way was referenced less recently based on the comparison result. The replacement object selector 303 generates and outputs the replacement way signal indicating the way that was referenced less recently. For example, if the bits corresponding to way 0 and way 1 are "00" and "10", respectively, the replacement object selector 303 outputs the replacement way signal indicating way 0. This replacement way signal is supplied to the selectors 206 and 213 shown in FIG. 2.

(B) When the on/off status information held in the register 304 indicates that both processors 111 and 112 are on-line and when the active signal indicates the processor 112:

The replacement object selector 303 compares the bits corresponding to ways 2 with the bits corresponding to way 3 (compares bits 4–5 with bits 6–7 in this embodiment). Those bits are included in the eight LRU bits output from the LRU bit hold register 302 and are allocated to the group for the processor 112. The replacement object selector 303 checks which way was referenced less recently based on the comparison result. The replacement object selector 303 generates and outputs the replacement way signal indicating the way that was referenced less recently. This replacement way signal is supplied to the selectors 206 and 213 shown in FIG. 2.

(C) When the on/off status information held in the register 304 indicates that the processor 111 is off-line and the processor 112 is on-line:

Based on the off-line distribution information, the replacement object selector 303 distributes ways 0–1, allocated to the group for the processor 111 that is off-line, to the processor 112 that is on-line. Based on the eight LRU bits outputted from the LRU bit hold register 302, the replacement object selector 303 selects the least-recently referenced way from ways 2 and 3 belonging to the group for the processor 112 and ways 0 and 1 newly distributed to the processor 112. After that, the replacement object selector 303 generates and outputs the replacement way signal indicating the selected way.

(D) When the on/off status information held in the register 304 indicates that the processor 112 is off-line and the processor 111 is on-line:

Based on the off-line distribution information, the replacement object selector 303 distributes ways 2–3, allocated to the group for the processor 112 that is off-line, to the processor 111 that is on-line. Based on the eight LRU bits outputted from the LRU bit hold register 302, the replacement object selector 303 selects the least-recently referenced way from ways 0 and 1 belonging to the group for the processor 111 and ways 2 and 3 newly distributed to the processor 111. After that, the replacement object selector 303 generates and outputs the replacement way signal indicating the selected way.

Referring to FIG. 6, the operation of this embodiment will be described more in detail.

For example, assume that the processor 111 sequentially outputs addresses in blocks A and B and then the processor 112 sequentially outputs addresses in blocks C, D, and E. In addition, after that, assume that the processor 111 sequentially outputs addresses in blocks A and B again. Note that blocks A–E are included in the same set i and that the cache memory BS is in the initial state.

Figure 6A:
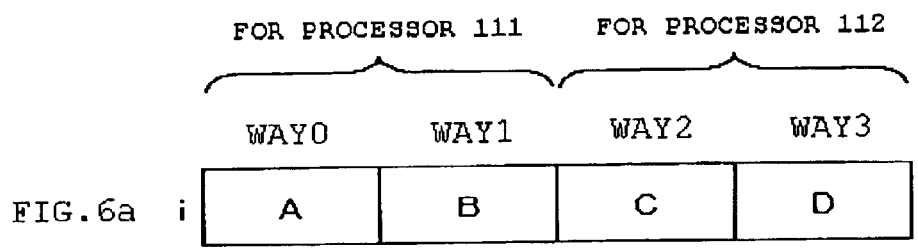
FIGS. 6a–6d are diagrams illustrating the operation of an embodiment.

When the processor 111 outputs addresses in blocks A and B and the processor 112 outputs addresses in blocks C and D, the copies of data of blocks A, B, C, and D are stored in ways 0, 1, 2, and 3 of set i of the data array 214, as shown in FIG. 6a. At this time, the LRU bits corresponding to set i of the LRU bit hold register 302 indicates ("00", "01", "10" and "11").

Figure 6B:
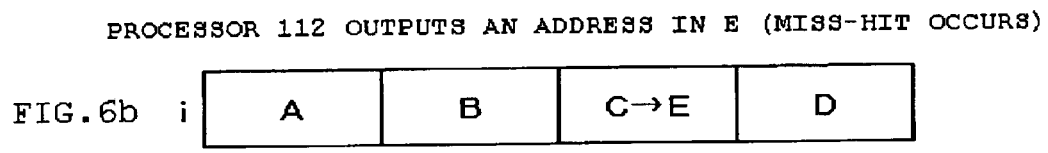

When the processor 112 outputs an address in block E, a miss-hit occurs. Because the processors 111 and 112 are both on-line and the ways for the processor 112 are limited to ways 2 and 3, the replacement object selector 303 references the LRU bits corresponding to way 2 and way 3 in the LRU bit hold register 302 to find the less recently referenced way. As the LRU bits of ways 2 and 3 are "10" and "11" respectively, the replacement object selector 303 selects way 2 as the replacement way and generates and outputs the replacement way signal. The selector 206 and 213 replace the data of the directory 207 and data array 214 according to the replacement way signal. Therefore, as shown in FIG. 6b, the copy of block C stored in way 2 is replaced by the copy of block E.

Figure 6C:
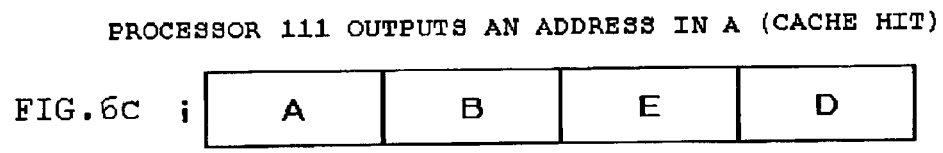
Figure 6D:
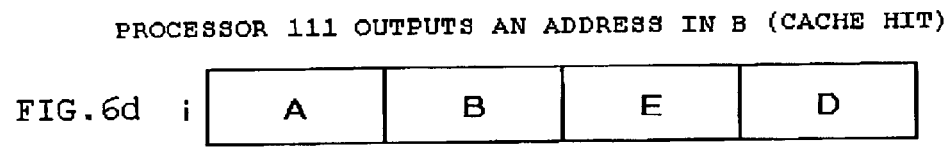
Figure 7:
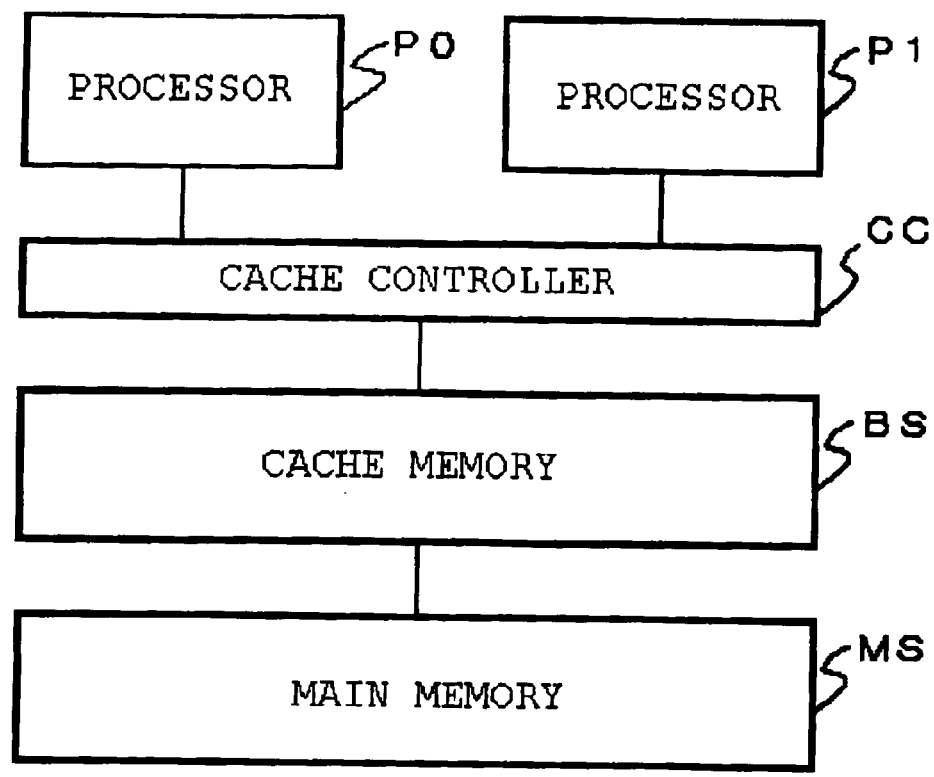
FIG. 7 is a diagram showing an example of a constitution of a standard multiprocessor system.
Figure 8A:
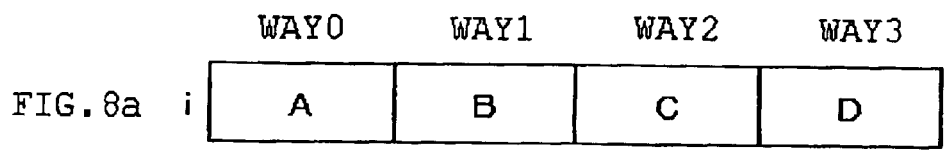
FIGS. 8a–8d are diagrams illustrating the operation of the prior art.
Figure 8B:
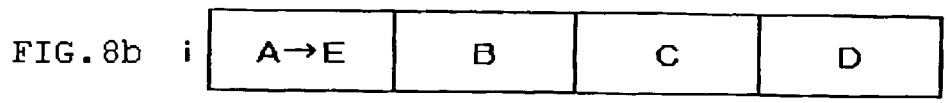
Figure 8C:
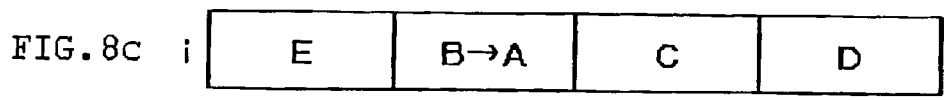
Figure 8D:
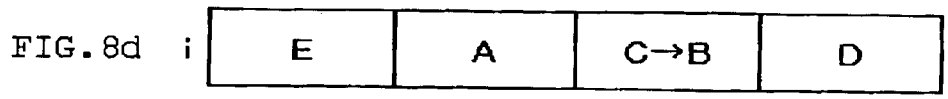

After that, even if the processor 111 sequentially outputs addresses in block A and B, a cache hit occurs as shown in FIGS. 6c and 6d with no conflict-miss between the processors.

Although two on-chip multiprocessor systems are used in the embodiment described above, three or more on-chip multiprocessor systems may also be used. In addition, although two processors are included in an on-chip multiprocessor system, three or more processors may also be included. Furthermore, although the four cache memory ways are used, any number of ways may be employed as long as the number of ways is larger than the number of on-chip processors. Although one port is used for the each of the read/write ports of the cache memory, multiple ports may also be used. The method according to the present invention may be applied also to the shared cache of an off-chip multiprocessor. Although applied to the L1 cache in the embodiment, the method may be applied also to the cache at the L2 or a lower hierarchy level.

As described above, the method or apparatus according to this invention divides the multiple ways of a cache memory into groups, one for each processor of a multiprocessor system. When a miss-hit occurs, one way to be replaced is selected from the ways belonging to the group of the processor that accessed the memory but caused the miss-hit. Therefore, this method or apparatus prevents a conflict-miss between the processors (a miss-hit that occurs when the copy of a block accessed by one processor is replaced by the copy of a block accessed by another processor). As a result, the method or apparatus reduces the number of data replacements caused by miss-hits and increases the processing speed of the multiprocessor system.

In addition, when there is a processor in the off-line state, the method or apparatus distributes the ways belonging to the group of the processor in the off-line state to the processor in the on-line state. Therefore, even when a processor enters the off-line state, the method or apparatus makes all the ways of the cache memory available for use, thus preventing the utilization efficiency of the cache memory from decreasing.

Although the preferred embodiments of the present invention have been described in detail, it should be understood that various changes, substitutions and alternations can be made therein without departing from spirit and scope of the inventions as defined by the appended claims.

What is claimed is:

1. A shared cache memory replacement control method in a multiprocessor system in which a plurality of processors share an n-way set-associative cache memory, comprising the steps of:

dividing a plurality of ways of said cache memory into groups corresponding to each of said processors; and when a miss-hit occurs, a replacement controller selecting one way to be replaced from the ways belonging to the group corresponding to a processor that caused the miss-hit.

2. The shared cache memory replacement control method according to claim 1, further comprising the steps of:

said replacement controller distributing the ways belonging to the group of an off-line processor to the group of an on-line processor according to an off-line distribution information indicating how the ways belonging to a group of an off-line processor should be distributed to a group of an on-line processor.

3. The shared cache memory replacement control method according to claim 1, further comprising the steps of:

said replacement controller selecting, if a miss-hit occurs when there is an off-line processor, one way to be replaced from the ways, belonging to the group of the processor that caused the miss-hit, and the ways, belonging to the group of the off-line processor and indicated by the off-line distribution information to be distributed to the group of the processor that caused the miss-hit.

4. The shared cache memory replacement control method according to claim 1 wherein, when one way to be replaced is selected from the ways, a least-recently referenced way is selected.

5. A shared cache memory replacement control apparatus in a multiprocessor system in which a plurality of processors share an n-way set-associative cache memory, said shared cache memory replacement control apparatus comprising:

a replacement controller that divides a plurality of ways of said cache memory into groups corresponding to each of said processors and that, when a miss-hit occurs, selects one way to be replaced from the ways belonging to the group corresponding a processor which caused the miss-hit.

6. The shared cache memory replacement control apparatus according to claim 5, said replacement controller includes an LRU bit hold register which contains LRU bits indicating a reference order of a plurality of ways in each set of the cache memory, wherein said replacement controller selects a least-recently referenced way based on said LRU bit from the ways belonging to the group corresponding a processor which caused the miss-hit.

7. The shared cache memory replacement control apparatus according to claim 6, said replacement controller further includes LRU update circuit which updates LRU bits of a set which is referenced or replaced by cache access.

8. The shared cache memory replacement control apparatus according to claim 6, said replacement controller further includes off-line distribution information indicating, when there is an off-line processor, how the ways belonging to a group of the off-line processor should be distributed to a group of an on-line processor.

9. The shared cache memory replacement control apparatus according to claim 8, wherein if a miss-hit occurs when there is an off-line processor, said replacement controller selects one way to be replaced from the ways, belonging to the group of the processor that caused the miss-hit, and the ways, belonging to the group of the off-line processor and indicated by the off-line distribution information to be distributed to the group of the processor that caused the miss-hit.

* * * * *